(12) United States Patent
Dziech et al.

(10) Patent No.: US 8,687,843 B2
(45) Date of Patent: Apr. 1, 2014

(54) METHOD AND SYSTEM FOR RESTRICTING ACCESS TO SENSITIVE CONTENTS OF DIGITAL IMAGES

(75) Inventors: Andrzej Dziech, Kielce (PL); Andrzej Glowacz, Cracow (PL); Pawel Korus, Cracow (PL); Wojciech Szmuc, Warsaw (PL)

(73) Assignee: AGH University of Science and Technology, Cracow (PL)

( * ) Notice: Subject to any disclaimer, the term of this patent is extended or adjusted under 35 U.S.C. 154(b) by 50 days.

(21) Appl. No.: 13/524,609

(22) Filed: Jun. 15, 2012

(65) Prior Publication Data

US 2012/0321127 A1     Dec. 20, 2012

(30) Foreign Application Priority Data

Jun. 16, 2011 (PL) .......................................... 395303

(51) Int. Cl.
  *G06K 9/00* (2006.01)
  *B42D 15/00* (2006.01)
  *H04N 1/40* (2006.01)
  *G09C 3/00* (2006.01)
  *H04L 9/32* (2006.01)

(52) U.S. Cl.
  USPC ............ 382/100; 283/113; 358/3.28; 380/54; 713/176

(58) Field of Classification Search
  None
  See application file for complete search history.

(56) References Cited

U.S. PATENT DOCUMENTS

| 2003/0172274 A1* | 9/2003 | Hsia et al. ..................... 713/176 |
| 2006/0251289 A1* | 11/2006 | Williams ...................... 382/100 |

* cited by examiner

*Primary Examiner* — Nirav G Patel
(74) *Attorney, Agent, or Firm* — Andrew F. Young, Esq.; Lackenbach Siegel, LLP

(57) ABSTRACT

The method for restricting access to sensitive contents of digital images using the digital watermarking technique for encoding and decoding sensitive contents of images is characterized in that the sensitive contents of an image are obscured, and the information necessary for the high quality reconstruction is encoded in the insensitive area of the transmitted image by modification of the DCT spectrum coefficients. The information concerning the obscured contents is retained by means of transform coefficients and processed independently. Noise with statistics identical to that of the digital watermark is inserted into the image after decoding. The system contains encoding unit including acquisition module connected with sensitive contents encoding module through sensitive patterns automatic detection module with attached memory buffer. Also, acquisition module is connected directly with sensitive contents encoding module and with compression module. In the decoding unit, stream decoding module is connected with image sensitive contents decoding module.

10 Claims, 3 Drawing Sheets

METHOD AND SYSTEM FOR RESTRICTING ACCESS TO SENSITIVE CONTENTS OF DIGITAL IMAGES

CROSS-REFERENCE TO RELATED APPLICATIONS

This application claims priority to Polish Patent Application No P.395303 entitled "The method and system for restricting access to sensitive contents of digital images" filed on Jun. 16, 2011, the entire contents of which is incorporated by reference.

BACKGROUND OF THE INVENTION

1. Field of the Invention

The present invention relates to a method for restricting access to sensitive contents of digital images alongside a system for the implementation of the method. The restriction is commonly applied to human faces, vehicle registration plates and content intended for adult recipients only.

The system for restricting access to sensitive contents of digital images according to the invention contains the encoding and decoding unit. In the encoding unit, the acquisition module is connected through the automatic sensitive area detection module with the sensitive contents encoding module and further with the compression module. A memory buffer is added to the automatic detection of sensitive patterns module. In the decoding unit, the stream decoding module is connected directly with the module for decoding the sensitive image contents.

2. Description of the Related Art

Further works in the same area facilitated the improvement of the selected system parameters at the expense of the remaining ones. So far it has not been possible to develop a method which would allow for high quality restoration for lossy JPEG compression at the level of 70-80, used in practice.

In the article "Images with Self-correcting Capabilities" by J. Fridrich and M. Goljan presented on the IEEE International Conference on Image Processing it was shown for the first time that it is possible to encode digital images in such a way that it is feasible to restore the fragments modified in any manner to a simplified version of the original contents. The simplification mentioned here consisted in encoding in the picture its lossy-compressed version stemming from the use of low-quality MEG representation. Despite the low reconstruction fidelity, a human would typically be able to recognize the restored content. Additionally, an image protected in this way needs to be stored in its lossless format as the lossy compression results in corruption of the additionally hidden information. The authors managed to gain robustness against JPEG compression with the quality level above 90 at the expense of significant loss of quality. In such conditions the expected image quality, expressed in terms of a peak-signal-to-noise-ratio, drops to 33 dB and 21 dB for the complete image and the restored fragments, respectively.

SUMMARY OF THE INVENTION

This invention relates to a method and system of restricting access to sensitive contents of digital images alongside a system for the implementation of the method. The restriction is commonly applied to human faces, vehicle registration plates and content intended for adult recipients only.

The aim of this invention is to develop a method and system that would allow for high-quality reconstruction of selected, previously obscured image fragments. The reconstruction may optionally be performed by authorized persons only. The developed method is preferably robust against prospective lossy compression, which might occur after the protection process. The method of restricting access to sensitive contents of digital images in accordance with the invention preferably uses the technique of digital watermarking for encoding and decoding.

The core of the method according to the invention is to hide sensitive contents of an image to the extent that it prevents its recognition, and the information necessary for its high-quality reconstruction is encoded in the insensitive area of the transmitted image by means of modification of the discrete cosine. The method of the invention performs all necessary processing in the DCT domain. Obscuration of the content, the generation of reconstruction reference and the encoding of that data with the use of digital watermarks are performed in the transform domain. The information necessary for reconstruction, being subsequent ratios of the transform, should be stored and processed independently. Accordingly, damages to data resulting from the image distortion first cause the loss of reconstruction quality instead of leading to mistakes. It is also beneficial to adjust the quality of the reconstructed areas to match the remaining part of the image. After successful extraction of the watermark and reconstruction of the content, the decoder adds a noise with watermark-identical statistics in order to improve the subjective perception of the image quality.

The system for restricting access to sensitive contents of digital images according to the invention contains the encoding and decoding unit. In the encoding unit, the acquisition module is connected through the automatic sensitive area detection module with the sensitive contents encoding module and further with the compression module. A memory buffer is added to the automatic detection of sensitive patterns module. In the decoding unit, the stream decoding module is connected directly with the module for decoding the sensitive image contents.

The image acquired by the acquisition module is directed to a common bus which is then accessed by subsequent functional modules of the system. The acquisition module is preferably a standard digital camera module for transmitting the current bitmap from the camera sensor to the above-mentioned bus. The bus serves the function of a shared memory between various modules of the system. The image of the current frame is read by two successive modules, namely the sensitive contents detection module and sensitive contents encoding module. In a typical hardware solution, both these modules are implemented in FPGA (field-programmable gate array) technology. A memory buffer is connected to the sensitive contents detection module and stores information on the appearance and characteristic points of sensitive fragments on the previous frames allowing for continuous detection of such patterns. The operation of the image fragments encoding module is triggered by signals from the detection module which informs about the completion of the image analysis steps and the availability of the sensitivity location.

The protected image is communicated between the encoding and decoding units as, for example, a JPEG file. The image is typically encoded and decoded by known means. Ready hardware functional modules for JPEG encoding and decoding were used for implementing the described units. The compression module is preferably a standard element used in digital cameras. It reads the current bit map from the bus after it has been modified by the module for encoding sensitive contents. Next, the resulting JPEG bit-stream is communicated to the decoding module responsible for the decoding of the JPEG stream on the receiving side. Analogically, for the compression module, the functionality of the decoding module does not vary from standard solutions. Preferably, the decoded bit map is located in the memory of the receiving equipment. The last step prior to the transfer of the image for further processing is its reconstruction in the sensitive contents decoding module. The reconstruction is conditioned by prior authentication of the connected receiving equipment. Similar to the sending side, the decoding module is preferably implemented in FPGA technology.

The above and other aspects, features and advantages of the present invention will become apparent from the following description read in conjunction with the accompanying drawings, in which like reference numerals designate the same elements.

BRIEF DESCRIPTION OF THE DRAWINGS

A further understanding of the present invention can be obtained by reference to a preferred embodiment set forth in the illustrations of the accompanying drawings. Although the illustrated preferred embodiment is merely exemplary of methods, structures and compositions for carrying out the present invention, both the organization and method of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF THE PREFERRED EMBODIMENTS

Figure 1:
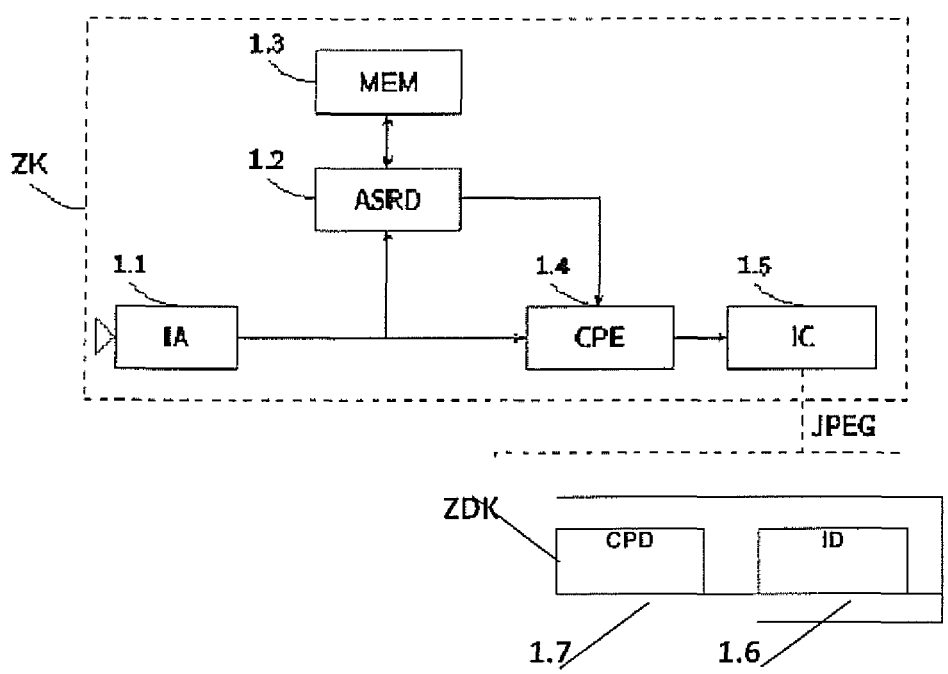
FIG. 1 is a schematic representation of the system for restricting access to sensitive contents of digital images according to the invention.

As required, a detailed illustrative embodiment of the present invention is disclosed herein. However, techniques, systems, compositions and operating structures in accordance with the present invention may be embodied in a wide variety of sizes, shapes, forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, below, etc., or motional terms, such as forward, back, sideways, transverse, etc. may be used with respect to the drawings. These and similar directional terms should not be construed to limit the scope of the invention in any manner.

Referring first to FIG. 1, shown is one exemplary embodiment of the system for restricting access to sensitive contents of digital images according to the invention. Preferably, as shown in FIG. 1, the system contains the encoding unit ZK and the decoding unit ZDK. In the encoding unit ZK the acquisition module IA 1.1 is connected with the sensitive contents encoding module CPE 1.4 through the module of automatic detection of sensitive patterns ASRD 1.2 to which the memory buffer MEM 1.3 is connected. Additionally, the acquisition module 1.1 is connected directly to the sensitive contents encoding module 1.4 and further to the compression module IC 1.5. In the ZDK decoding unit, the stream decoding module ID 1.6 is connected with the image sensitive contents decoding module CPD 1.7.

The image acquired by the acquisition module is directed to a common bus which is then accessed by subsequent functional modules of the system. The acquisition module is preferably a standard digital camera module for transmitting the current bitmap from the camera sensor to the above-mentioned bus. The bus serves the function of a shared memory between various modules of the system. The image of the current frame is read by two successive modules, namely the sensitive contents detection module and sensitive contents encoding module. In a typical hardware solution, both these modules are implemented in FPGA (field-programmable gate array) technology. A memory buffer is connected to the sensitive contents detection module and stores information on the appearance and characteristic points of sensitive fragments on the previous frames allowing for continuous detection of such patterns. The operation of the image fragments encoding module is triggered by signals from the detection module which informs about the completion of the image analysis steps and the availability of the sensitivity location.

The protected image is communicated between the encoding and decoding units as, for example, a JPEG file. The image is typically encoded and decoded by known means. Ready hardware functional modules for JPEG encoding and decoding were used for implementing the described units. The compression module is preferably a standard element used in digital cameras. It reads the current bit map from the bus after it has been modified by the module for encoding sensitive contents. Next, the resulting JPEG bit-stream is communicated to the decoding module responsible for the decoding of the JPEG stream on the receiving side. Analogically, for the compression module, the functionality of the decoding module does not vary from standard solutions. Preferably, the decoded bit map is located in the memory of the receiving equipment. The last step prior to the transfer of the image for further processing is its reconstruction in the sensitive contents decoding module. The reconstruction is conditioned by prior authentication of the connected receiving equipment. Similar to the sending side, the decoding module is preferably implemented in FPGA technology.

Figure 2:
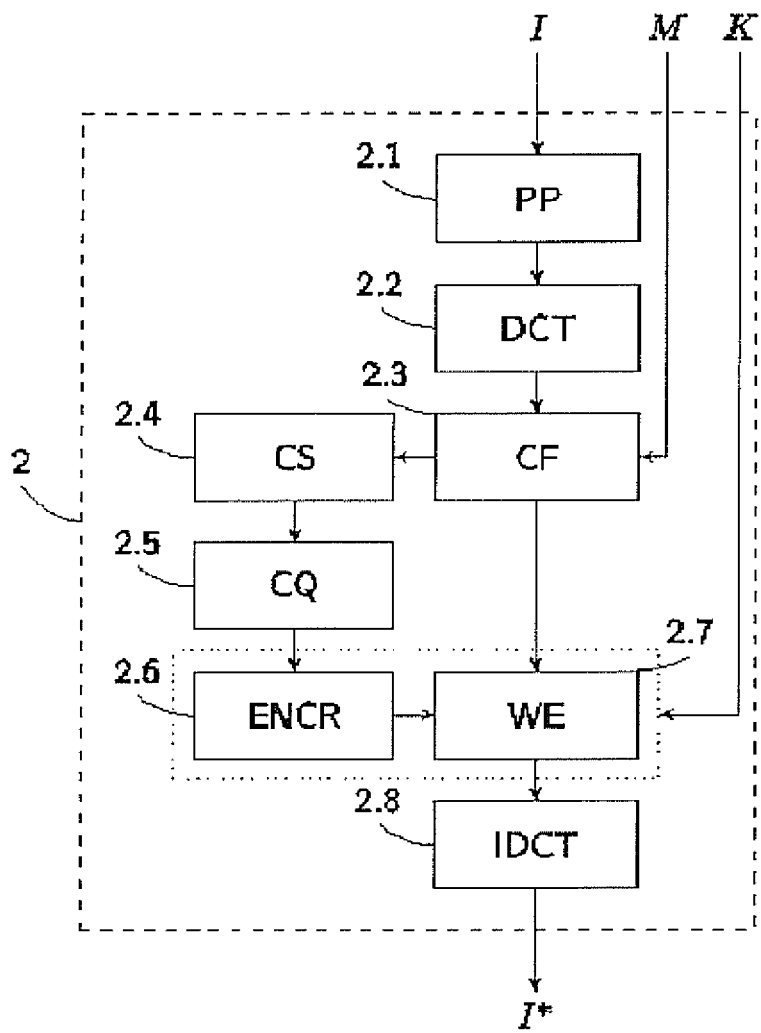
FIG. 2 illustrates the subsequent steps within the encoding unit for use with the system for restricting access to sensitive contents of digital images according to the invention.
Figure 3:
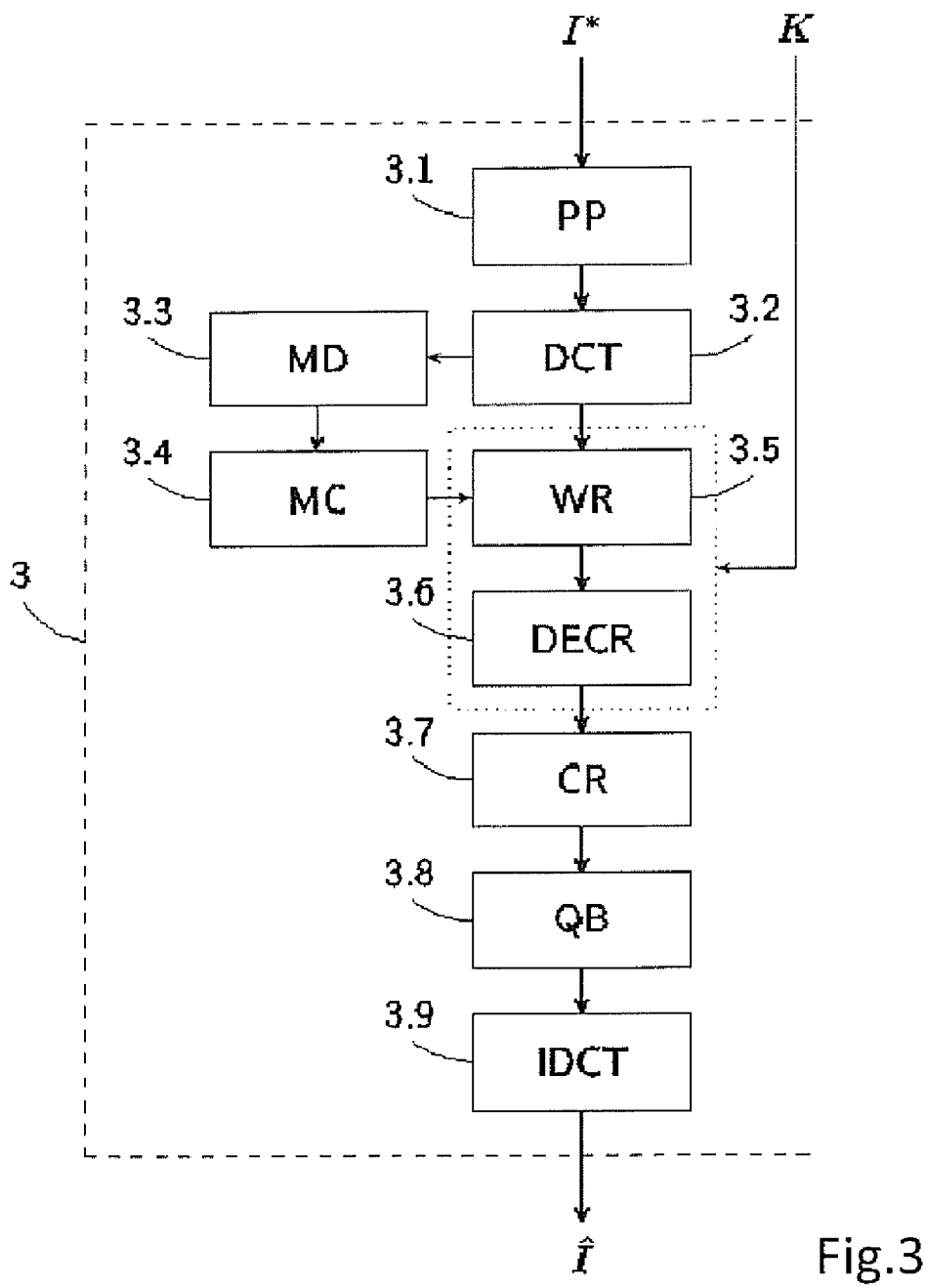
FIG. 3 illustrates subsequent steps in the decoding unit for use with the system for restricting access to sensitive contents of digital images according to the invention.

According to preferred method of the invention, as shown in FIGS. 2-3, the method includes the preparation of the input image in the initial processing block PP 2.1. The aim of this processing is to guarantee the readability of data in the image after the encoding procedure by introducing the required separation from the saturated pixel intensity values 0 and 255 in the 8-bit representation. This block also performs uniform division of the image into a block of required size. The input image is subsequently transformed block-wise (e.g., block-by-block) to transform the domain in domain transform module DCT 2.2.

In the next step, the method involves identification of the blocks containing the sensitive contents based on the given mask M and the elimination of the spectrum coefficients in elimination module CF 2.3. After filtering, only the coefficients responsible for the average block intensities, i.e., the first coefficient of the block spectrum, remain in the sensitive areas. In order to ensure high quality reconstruction, the invention preferably involves retaining coefficients with the highest absolute values for the purpose of reconstruction. Selection module CS 2.4 controls the selection of coefficients and passes them on for quantization in quantization module CQ 2.5, which prepares the watermark bit-stream for embedding in the subsequent steps of the algorithm and method.

According to the preferred embodiment of the invention, the system and method defines two levels of protection for the reconstruction reference: (1) encryption in module ENCR 2.6 and (2) random selection of the embedding order in the watermarking module WE 2.7. Encryption module ENCR 2.6 and watermarking module WE 2.7 are controlled with the use of a secret key K, known only to the owner and the final recipient of the contents. After the reconstruction reference has been embedded in the image, the transform module IDCT 2.8 performs the inverse transform to the initial, spatial representation of the image. The detector module of the described invention performs the reconstruction of the obscured fragments of the image upon request of the users possessing the key authorizing them to view the original content of the image.

Referring next to FIG. 3, shown is the method of image reconstruction according to the invention. The initial processing module PP3.1 prepares the image and divides it into blocks for the needs of further processing. The transformation of the image into its spectrum is performed in transformation module DCT 3.2.

The next step of reconstruction, according to the invention, is the identification of the obscured fragments in the mask detection module MD 3.3 and the correction of prospective errors of that stage in correction module MC 3.4. According to the invention, the detection involves the analysis of each block for the detection of artifacts with noise-like characteristics, introduced into the image during encoding in watermarking module WE 2.7. The mask correction procedure exploits the limitation of possible shapes of sensitive fragments to the rectangular areas only, and it removes any shapes that are not potentially damaged rectangles. The watermark recovery module WR 3.5 then reads the reconstruction reference which is used by the spectrum reconstruction module CR 3.7 to restore the original appearance of the obscured fragments of the image after the decryption of the coefficients by module DECR 3.6.

The method defined by the invention involves an additional stage of quality adaptation QB 3.8 which aims to adjust the distortions appearing in the reconstructed fragments to the remaining part of the image. As a result, the boundary between the regions, lowering image quality as perceived by a human eye, becomes less visible. The invention performs the described adaptation procedure by analyzing the statistics of the noise-like artifacts in the non-sensitive image regions, and introducing artificial analogous noise in the reconstructed fragments. Finally, the spatial domain is inversely transformed in the transform module IDCT 3.9.

In the claims, means or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that such embodiments are merely exemplary and that the invention is not limited to those precise embodiments, and that various changes, modifications, and adaptations may be effected therein by one skilled in the art without departing from the scope or spirit of the invention as defined in the appended claims. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A method of restricting access to sensitive contents of digital images with the use of digital watermarks for encoding and decoding of the sensitive contents of images characterized in that the sensitive contents of an image are obscured and the information necessary for their high quality reconstruction is encoded in the insensitive area of the transmitted image by modification of the DCT spectrum, wherein the information on the sensitive contents of the image is encoded as the transform ratio and processed independently, and wherein a noise with identical statistics as the digital watermark is inserted into the image after decoding.

2. The method according to claim 1, wherein said image is available to unprivileged users and the original content is restored on demand for authorized users.

3. The method according to claim 2, wherein, for privacy protection in close-circuit television systems, the sensitive contents are automatically detected and tracked by a dedicated detection module equipped with a memory for storing the identified objects.

4. The method according to claim 2, wherein, for privacy protection of visual data in social networks, the sensitive contents are either manually selected or automatically detected and an original content of said selected fragments being automatically restored for authorized users.

5. The method according to claim 2, wherein, for visual content distribution, the image is publicly distributed for preview purposes, and upon purchase by a customer said customer is provided with a secret key allowing them to reconstruct an original content of the image.

6. A method for restricting access to selected fragments of digital images, said method comprising the steps of:
   obscuring selected fragments by pixelization during transmission between an encoding unit and a decoding unit,
   retaining only low-frequency coefficients of a block-based spectrum of an image to perform said pixelization,
   restoring with high quality the original appearance of the obscured fragments by said decoding unit,
   using reference information in the protected image by means of an embedded digital watermark to perform said restoring, and
   deriving said reference information from selected high-amplitude coefficients of the spectrum,
   wherein said restoring is possible only by having access to a secret key, and wherein said restoring is followed by addition of an artificial noise in said restored fragments, said artificial noise having identical statistics as said embedded digital watermark.

7. The method according to claim 6, wherein said protected image is available to unprivileged users and the original content is restored on demand for authorized users.

8. The method according to claim 7, wherein, for privacy protection in close-circuit television systems, the selected fragments are automatically detected and tracked by a dedicated detection module equipped with a memory for storing the identified objects.

9. The method according to claim 7, wherein, for privacy protection of visual data in social networks, the selected fragments are either manually selected or automatically detected and an original content of said selected fragments being automatically restored for authorized users.

10. The method according to claim 7, wherein, for visual content distribution, the protected image is publicly distributed for preview purposes, and upon purchase by a customer said customer is provided with a secret key allowing them to reconstruct an original content of the protected image.

* * * * *